(12) United States Patent
Kim et al.

(10) Patent No.: US 7,072,677 B2
(45) Date of Patent: Jul. 4, 2006

(54) METHOD OF OPERATING SEARCHER IN A MOBILE COMMUNICATION SYSTEM

(75) Inventors: Jong Heon Kim, Seoul (KR); In Jeong Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 10/330,195

(22) Filed: Dec. 30, 2002

(65) Prior Publication Data

US 2003/0125060 A1  Jul. 3, 2003

(30) Foreign Application Priority Data

Dec. 29, 2001 (KR) .................. 10-2001-0088506
Dec. 29, 2001 (KR) .................. 10-2001-0088507

(51) Int. Cl.
*H04B 7/00* (2006.01)
*H04Q 7/20* (2006.01)

(52) U.S. Cl. ............... 455/509; 455/422.1; 455/455; 455/456.1; 370/342

(58) Field of Classification Search ............ 455/436, 455/67.1, 456.1, 455, 33.1, 422.1, 423, 450, 455/451, 452.1, 452.2, 434, 515, 512, 509; 370/342
See application file for complete search history.

(56) References Cited

U.S. PATENT DOCUMENTS

| | | | |
|---|---|---|---|
| 5,134,706 A * | 7/1992 | Cushing et al. | 710/268 |
| 5,519,884 A * | 5/1996 | Duque-Anton et al. | 455/450 |
| 6,226,282 B1 * | 5/2001 | Chung | 370/335 |
| 6,327,469 B1 * | 12/2001 | Gaastra | 455/436 |
| 6,782,264 B1 * | 8/2004 | Anderson | 455/456.1 |
| 2002/0183054 A1 * | 12/2002 | Rimoni et al. | 455/423 |
| 2003/0092391 A1 * | 5/2003 | Amerga | 455/67.1 |
| 2004/0053614 A1 * | 3/2004 | Il-Gyu et al. | 455/436 |
| 2004/0162064 A1 * | 8/2004 | Himmelstein | 455/422.1 |

* cited by examiner

*Primary Examiner*—Nay Maung
*Assistant Examiner*—Tuan H. Nguyen
(74) *Attorney, Agent, or Firm*—Fleshner & Kim, LLP

(57) ABSTRACT

Disclosed is a method of operating searchers, and setting a search information list and searching channels for the same. In a communication system, a method of searching channels, comprises the steps of generating a queue of priorities for each search mode, allocating to searchers search items having higher priorities based on the queue, and searching the search items by the allocated searchers.

8 Claims, 7 Drawing Sheets

METHOD OF OPERATING SEARCHER IN A MOBILE COMMUNICATION SYSTEM

This application claims the benefit of the Korean Application Nos. P2001-88506 and P2001-88507 filed on Dec. 29, 2001, which is hereby incorporated by reference.

BACKGROUND OF THE INVENTION

1. Field of the Invention

The present invention relates to a method of operating a searcher in a mobile communication system.

2. Background of the Related Art

Typically, a code-division multiple access (CDMA) mobile communication system includes a mobile station and a base station. A CDMA signal modulated by and transmitted from the mobile station is received at the base station. The base station demodulates the CDMA signal so as to obtain the original signal. There is a pilot signal for synchronization and power control as one type of the CDMA signal. The pilot signal is a signal spread with a PN code sequence inherent to a terminal, and transmitted to the base station. The base station can demodulate other types of received signals by finding respective time delays, e.g., PN offsets, of multipath components of the pilot signal after searching multi-path pilot signals. In order to find the PN offsets, a searcher despreads the multi-path pilot signals with all PN offsets, averages respective energies of the despreaded pilot signals, and selects, as the PN offsets, PN offsets of averaged energies greater than a specified threshold value among the averaged energies.

Conventionally, there are respective searchers coupled to M channel elements.

Due to the characteristics of a data burst randomizer (DBR) on an IS-95-A/B reverse link, data is transmitted during two 1.25 ms sub-periods of 20 ms transmission period if the data transmission rate is lowest (for instance, 1200 or 1800 bps), and data may be not transmitted during other sub-periods of the 20 ms period. However, according to the conventional technology, since respective searchers are essentially coupled to M channel elements and thus the searchers cannot be shared other channel elements, the searchers may unnecessarily operate even in a period when a corresponding channel element does not have receiving data according to an operation of the DBR, resulting in an inefficient search operation.

SUMMARY OF THE INVENTION

An object of the present invention is directed to a method of operating a searcher in a mobile communication system that substantially obviates one or more problems due to limitations and disadvantages of the related art.

Another object of the present invention is to provide operating a searcher in a mobile communication system that can support a plurality of channel elements whose number is larger than that of searchers provided to the communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating a searcher in a mobile communication system, comprises the steps of generating a queue of priorities for each search mode, allocating to searchers searching items having higher priorities based on the queue, and searching the searching items by the allocated searchers.

Preferably, the search mode is at least one of an access preamble search mode, a traffic preamble search mode, and a traffic multi-path search mode.

Preferably, the search modes have different priorities and search items of a queue of a search mode having a higher priority are first searched.

Preferably, a priority is greater in an order of the access preamble search mode, the traffic preamble search mode, and the traffic multi-path search mode.

Preferably, search information lists of the search modes commonly have a channel type, a search mode, a number of search sectors, a search sector list, a current search sector index, and a current search window.

Preferably, a search information list of the access preamble search mode further includes an access preamble size, an access slot size, an access frame index, and access search done time.

Preferably, a search information list of the traffic preamble search mode further includes a frame offset, and information on a first power control group and a second power control group.

Preferably, the search mode is at least one of an enhanced access preamble search mode, a traffic preamble search mode, and a traffic multi-path search mode.

Preferably, the search modes have different priorities and search items of a queue of a search mode having a higher priority are first searched.

Preferably, a priority is greater in an order of the enhanced access preamble search mode, the traffic preamble search mode, and the traffic multi-path search mode.

Preferably, search information lists of the search modes commonly have a channel type, a search mode, a number of search sectors, a search sector list, a current search sector index, and a current search window.

Preferably, a search information list of the enhanced access preamble search mode further includes an on/off length of an enhanced access channel preamble, a number of repetition of the on/off, a slot size of the enhanced access channel, an offset of a slot boundary of the enhanced access channel within a slot duration, a slot offset number, and a time of a last completed search.

Preferably, a search information list of the traffic preamble search mode further includes a frame offset.

According to another aspect of the present invention, an apparatus of operating a searcher in a mobile communication system, comprises a first controller for generating a queue of priorities for each search mode and allocating to searchers search items having higher priorities based on the queue, a timer for being aligned with a system reference time and generating a current time information, a second controller for generating an interrupt to the first controller based on the time information and controlling the first controller such that the first controller may clear the generated interrupt, and searchers for searching offsets of the allocated search items.

Preferably, the second controller generates at least one of a time tick interrupt and an offset time tick interrupt.

Preferably, the system performs a routine of a search resource management based on the time tick interrupt.

Preferably, the system performs a search-done routine based on the offset tick interrupt.

The apparatus further comprises a first buffer for storing search parameters of the searchers, and a second buffer for storing search results of the searchers.

According to still another aspect of the present invention, a method of operating a searcher in a mobile communication system for generating a queue of priorities for each search mode and first allocating to searchers search items having higher priorities based on the queue, comprises the steps of (a) setting a type and a search mode according to established channel, (b) setting a search sector index, an antenna, a search start offset, a search window size on a search sector list and increasing a number of sectors, (c) registering at least one channel on the queue as the search items, (d) removing search items of a released and/or search-done channel from search items of the queue, and (e) flushing a search sector list of the released and/or search-done channel and setting the number of sector as '0'.

Preferably, the (a) step further comprises the steps of (a1) further setting a frame offset in traffic channel search mode, and (a2) further setting an access preamble size, an access slot size, and an access channel last search-done time as '0'.

According to still another aspect of the present invention, a method of operating a searcher in search mode change of a mobile communication system for generating a queue of priorities for each search mode and first allocating to searchers search items having higher priorities based on the queue, comprises the steps of (a) acquiring a preamble of a traffic channel, and (b) changing a search mode of the search information list into a traffic multi-path search mode.

According to still another aspect of the present invention, a method of operating a searcher in softer handoff mode of a communication system for generating a queue of priorities for each search mode and first allocating to searchers search items having higher priorities based on the queue, comprises the steps of (a) setting a search sector index, an antenna, a search start offset, a search window size on a search sector list of a sector added in the softer handoff mode and increasing a number of sectors, and (b) setting a search sector index, an antenna, a search start offset, a search window size on a search sector list of a sector dropped in the softer handoff mode and decreasing a number of sectors.

According to still aspect of the present invention, a method of operating a searcher in a communication system for generating a queue of priorities for each search mode and first allocating to searchers search items having higher priorities based on the queue, comprises the steps of (a) setting a number of channels of a first queue of a first search mode as a number of remaining channels, (b) when a number of allocated searchers is less than that of all searchers, setting a first priority search item of the first queue as a current search item and checking whether the first priority search item is searched, (c) when the first priority search item is searched, allocating a search to the first priority search item,(d) searching the first priority search item until the first priority search item is nulled,(e) repeating the (b), (c), and (d) steps until the number of allocated searchers is not less than that of all of the searchers, and (f) when the number of remaining channels is equal to '0', setting a second priority search item of a second queue as the current search item and searching the second priority search item.

Preferably, the method further comprises (g) when the search item of the second queue is nulled, setting a third priority search item of a third queue as the current search item and searching the third priority search item.

Preferably, the method further comprising the step of searching the current search item set for turned-on search period where the third search mode supports a search-on/search-off for each search period.

Preferably, the first search mode is an access preamble search mode, the second search mode is traffic preamble search mode, and the third search mode is traffic multi-path search mode.

Preferably, the (d) step further comprising the step of partial searching by search sector and/or search window of the search item.

Preferably, the method further comprising the step of storing and updating the partial-search result by search sector and/or by search window.

Preferably, the first search mode is an enhanced access preamble search mode, the second search mode is traffic preamble search mode, and the third search mode is traffic multi-path search mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
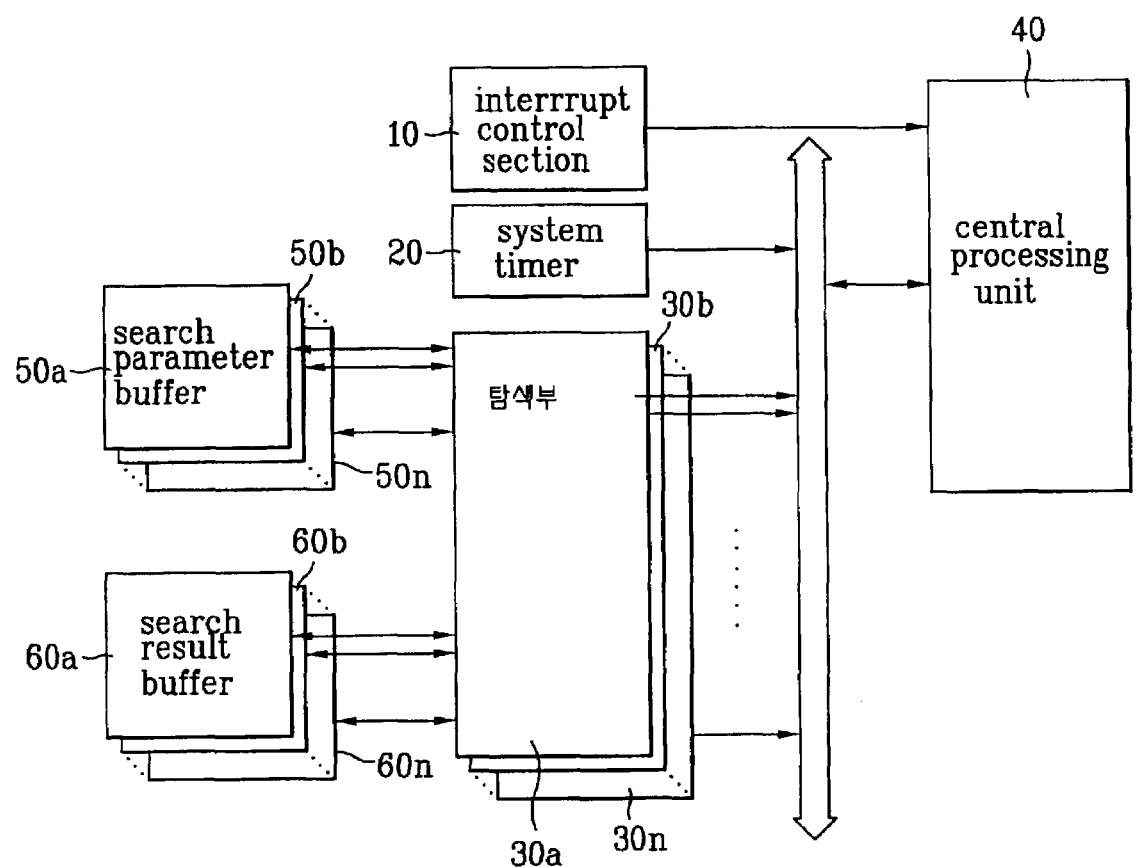
FIG. 1 is a block diagram of base station for operating searchers according to a preferred embodiment of the present invention.

FIG. 1 is a block diagram of base station for searching operation according to a preferred embodiment of the present invention.

The present invention refers to a searcher operating method that supports M channel elements by using $N(M \geq N)$ searchers in a communication system, and in particular, in a base station.

For the searcher operating method, the base station includes a central processing section 40 for generating a queue of priorities for each search mode and first allocating to searchers search items having higher priorities based on the queue, a system timer 20 for being aligned with a system reference time and generating a current time information, an interrupt controller 10 for generating an interrupt to the central processing unit 40 based on the time information and controlling the central processing section 40 such that the central processing section 40 may clear the generated interrupt, and searcher section 30 for being allocated to the search items and despreading multi-path pilot signals with all PN offsets under control of the central processing section 40, averaging respective energies of the despreaded pilot signals, and selecting, as the PN offsets, PN offsets of averaged energies greater than a specified threshold value among the averaged energies.

In the present invention, the interrupt controller 10 generates two kinds of interrupts, e.g., a time tick interrupt and an offset time tick interrupt, are used.

The time tick interrupt is generated by every 1.25 ms by being aligned with the system reference time. A corresponding searcher performs a search resource management subroutine according to the time tick interrupt under control of the central processing unit 40.

The offset time tick interrupt is generated by every 1.25 ms with a predetermined offset from the system reference time. A corresponding searcher performs a search done subroutine according to the offset time tick interrupt under the central processing section 40.

The respective searchers 30a~30n is provided with search parameter buffers 50a~50n for storing respective search parameters and search result buffers 60a~60n for storing respective search results. The respective searchers start searching operation based on a search start command of the central processing unit 40 at a boundary of every 1.25 ms sub-period of the searcher reference time of the searcher section 30. The searcher reference time of the searcher section 30 is apart from a processing delay time of the searcher section 30 from the system reference time.

When the searchers are permitted such that each searcher occupies a time slot to be required so that a certain i-th searcher performs a hypothesis test for the searching operation during a predetermined offset with respect to one search command, a relationship of $R_1+R_2+ \ldots R_N \leq R$ is effected between the N searchers 30a~30n and rake widths $R_x$ allocated to respective searchers 30a~30n.

Specifically, within the total rake width R, the searchers 30a~30N may occupy the time slot depending on changes of the number of searchers 30a~30n and/or the rake widths of the respective searchers 30a, 30b, ... 30n. In the present invention, the searchers 30a~30n are operated with the fixed number of searchers and/or the fixed rake width of the respective searchers.

The data burst randomizer (DBR) is a technique applied to Radio Configuration 1 and Radio Configuration 2 that form the reverse-link radio configuration of the IS-95-A/B system. Herein, the radio configuration is to define a type of coding method, a type of coding rate, a type of interleaver size, etc. A channel element processes data according to a specific radio configuration.

On the assumption that a 20 ms frame is divided into 16 1.25 ms power control groups (PCGs), which are denoted as PCG0, PCG1, ... PCG15, the respective PCGs are turned on/off according to the DBR pattern. Each PCG is masked with 1,536 long codes. The last 14 long codes out of 1536 long codes masking PCG14 determine the DBR pattern of the next 20 ms frame.

The long codes are determined by a long code state common to all the channels and a long code mask having an inherent value for each channel.

Also, a boundary between frames is determined by a frame offset that is designated to the respective channel.

If the 14 long codes are referred to as b0, b1, ... b13 in the order of generation, the PCGs (PCG0, PCG1, ... PCG15), which are turned on according to a DBR pattern of a corresponding data transmission rate, are determined as follows. At this time, PCGs in front of numerals will be omitted for convenience'sake.

When the data transmission rate is 9,600 or 14,400 bps, 0, 1, 2, 3, 4, 5, 6, 7, 8, 9, 10, 11, 12, 13, 14, 15.

When the data transmission rate is 4,800 or 7,200 bps, b0, 2+b1, 4+b2, 6+b3, 8+b4, 10+b5, 12+b6, 14+b7.

When the data transmission rate is 2,400 or 3,600 bps,
b0 if b8=0, or 2+b1 if b8=1;
4+b2 if b9=0, or 6+b3 if b9=1;
8+b4 if b10=0, or 10+b5 if b10=1;
12+b6 if b11=0, or 14+b7 if b11=1.

When the data transmission rate is 1,200 or 1,800 bps,
b0 if (b8,b12)=(0,0), or
2+b1 if (b8,b12)=(1,0), or
4+b2 if (b9,b12)=(0,1), or
6+b3 if (b9,b12)=(1,1);
8+b4 if (b10,b13)=(0,0), or
10+b5 if (b10,b13)=(1,0), or
12+b6 if (b11,b13)=(0,1), or
14+b7 if (b11,b13)=(1,1).

Herein, PCGx which is turned on for a lower data transmission rate, is always turned on for a data transmission rate which is greater than the lower data transmission rate.

In the present invention, the method of operating the searcher section 30 (hereinafter, referred to as searchers) is performed in a manner that priorities are provided to channel elements of which search operation is necessary, and the searchers are allocated to corresponding channel elements according to the priorities of the channel elements. With regard to the same priority of channel elements, the searchers are first allocated to channel elements of which search was done before the longest time.

In order to effect an efficient search according to priorities of channel elements, the search queues are operated in a manner that an independent search queue is set for each search mode, searchers are first allocated to corresponding channel elements according to priorities of channel elements, wherein the priorities are queued for each search mode. If at least two channel elements have the same priority, the search order of the at least two channel elements is determined based on order in queue which is set for a corresponding search mode. The search mode for channels of the IS-95-A/B system is classified into three kinds: an access preamble search (ACH) mode, a traffic preamble search (PAM) mode, and a traffic multi-path search (MUL) mode.

The ACH mode is a search mode having a highest priority, and the search should be performed for an access preamble section on each access slot. The DBR is not applied to the ACH mode.

The PAM mode is a search mode having an intermediate priority. The DBR is not applied to the PAM mode.

The MUL mode is a search mode having the lowest priority. The DBR is applied to the MUL mode. In case of the MUL mode, the searcher is allocated only to the PCG section that is always turned on based on DBR information of the respective channel, and the search performance is improved.

Respective types of search information list required for M channels have common items as follows.

Channel type: a channel type item informs whether a corresponding channel is an access channel or a traffic channel.

Search mode (SrchMode): a search mode item informs whether a search mode is the ACH, PAM, or MUL.

Number of search sectors (NumSrchSector): an item of the number of sectors informs a number of sectors for which the search is to be performed.

Search sector list (SrchSectorList): the search sector list item informs search sector lists (SearchSource (an index of searched sector and an antenna)) corresponding to a number of sectors for which the search should be performed, and information on a search start offset and a search window size (SearchStartOffset, SearchWindowSize).

Current Search sector index (CurrSrchSectorIdx): the current search sector index informs which sector is being searched among sectors which will be searched based on the SrchSectorList.

Current search window (CurrSrchWin): the current search window (CurrSrchWin) informs a number of a partial search when one partial search is performed during each search rake to perform the search during the SearchWindowSize.

Next, a search information list required for an access channel is as follows.

Access preamble size: AccessPamSize

Access slot size: AccessSlotSize

Access frame index (AccessFrameIdx): the access frame index informs a number of the present frame on the access slot.

Access channel last search-done time (AchLastSrchDoneTime): the access channel last search-done time informs time when the complete search of the access channel was lastly performed.

Next, a search information list required for a traffic channel is as follows.

Frame offset (FrameOffset): the frame offset informs a frame offset of the traffic channel.

First PCG (FirstPCG): the first PCG informs an index of PCG that is first turned on based on DBR information among a plurality of PCGs over the traffic channel when the data transmission rate is 1,200 or 1,800 bps.

Second PCG (SecondPCG): the second PCG informs an index of PCG that is secondly turned on based on DBR information among a plurality of PCGs over the traffic channel when the data transmission rate is 1,200 or 1,800 bps.

The searcher operating method proposed by the present invention is briefly classified into 7 subroutines.

A first search subroutine is performed at a channel setup.

A second search subroutine is performed at a channel release.

A third search subroutine is performed at a search mode change of a channel.

A fourth subroutine is performed at a softer handoff mode setup.

A fifth subroutine is performed at a softer handoff mode release.

A sixth subroutine is a search resource management subroutine.

A seventh subroutine is a search-done subroutine.

First, the search subroutine at the setup of a certain i-th channel is as follows:

At a first step, a channel type (ChannelType) item of a search information list of the i-th channel is set to one of an access channel, a traffic channel, etc.

The search mode (SrchMode) item is set to one ACH in the access channel setup, to the PAM in the traffic channel setup, etc.

For traffic channels, a frame offset is set to a value designated for each traffic channel.

For access channels, an access preamble size (AccessPamSize) and an access slot size (AccessSlotSize) are set to values designated for each access channel respectively, and an access channel last search-done time (AchLastSrchDoneTime) is initialized as '0'.

At a second step, search parameters such as search source, search start offset, search window size, etc., of i-th channel are set on a first search sector list (SrchSectorList) of a search information list of the i-th channel, and a number of search sectors (NumSearchSector) is set to '1'.

At a third step, the i-th channel is registered as a search item with the search queue of a corresponding search mode (SrchMode).

Second, the search subroutine at the release of a certain i-th channel is as follows:

At a first step, the i-th channel search item is removed from the search queue based on the search mode (SrchMode) of the i-th channel.

At a second step, the search sector list (SrchSectorList) of the i-th channel is initialized, and a number of the search sectors (NumSrchSector) is set to '0'.

Third, the search subroutine in change of a search mode of a certain i-th channel is as follows:

With regard to traffic channels, when the search mode is changed to the multi-path search mode after the preamble acquisition, the search mode (SrchMode) in a search information list of the i-th channel is set to the MUL.

Fourth, the search subroutine at the softer handoff mode setup of a certain i-th channel is as follows:

When any sector is added to an active set in a softer handoff procedure and information on the added sector is included by a search information list of the i-th channel, information on the search source (SearchSource), a search window size (SearchWindowSize), and a search start offset (SearchStartOffset) is added to the NumSrchSector-th search sector list (SrchSectorList), and a number of search sectors (NumSrchSector) is increased by '1'.

Fifth, the search subroutine at the softer handoff mode release of a certain i-th channel is as follows.

A number of search sectors (NumSrchSector) in the search information list of a certain i-th channel is decreased by '1'. Then, the information on the search source (SearchSource), the search start offset (SearchStartOffset), and the search window size (SearchWindowSize) of the sector is removed from the search sector list (SrchSectorList).

Sixth, the search resource management subroutine will be explained with reference to FIGS. 2a and 2b. Seventh, the search-done subroutine will be explained with reference to FIGS. 4a and 4b.

Figure 2A:
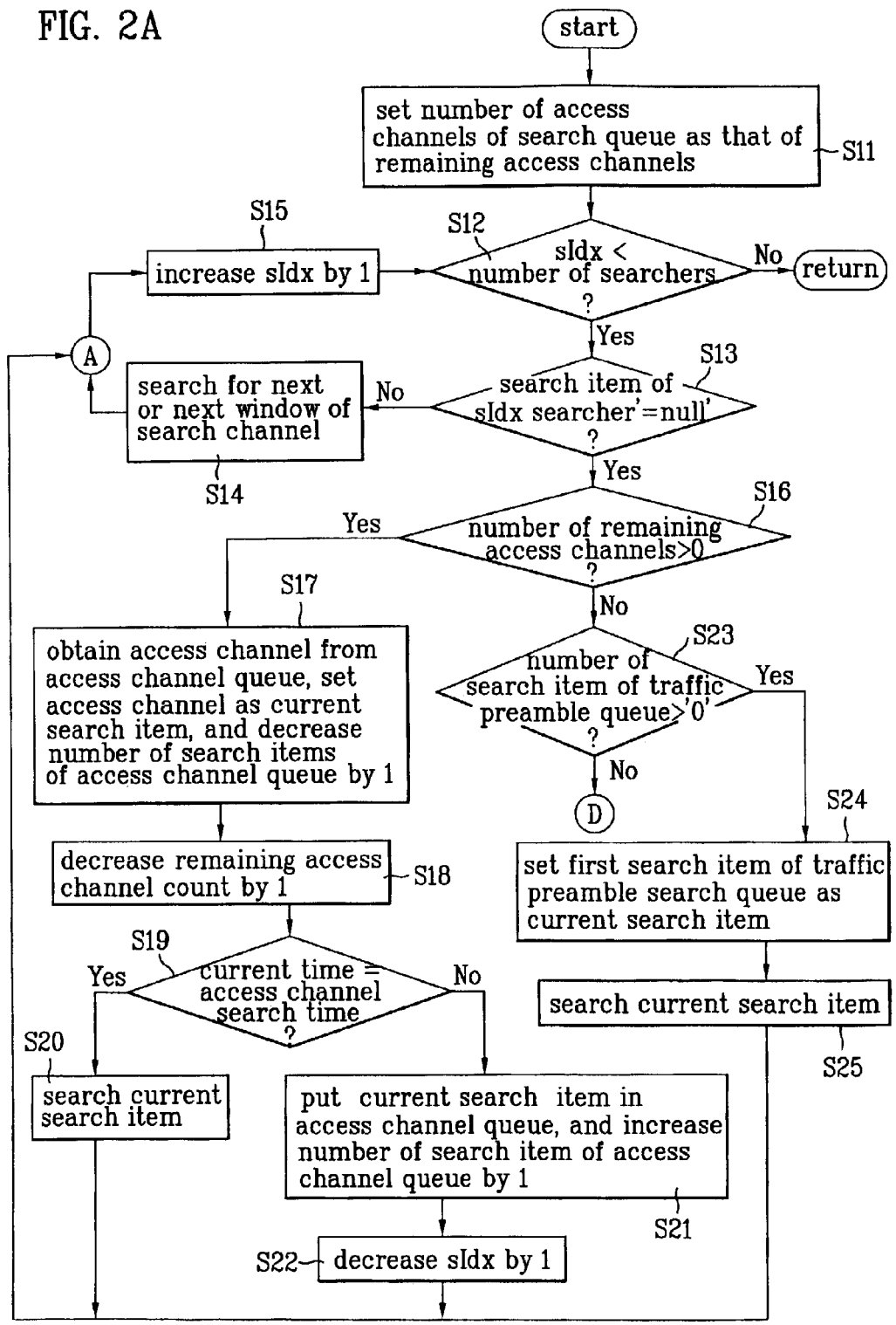
FIGS. 2a and 2b illustrate a flowchart explaining a search resource management subroutine in the searcher operating method according to a first embodiment of the present invention.
Figure 2B:
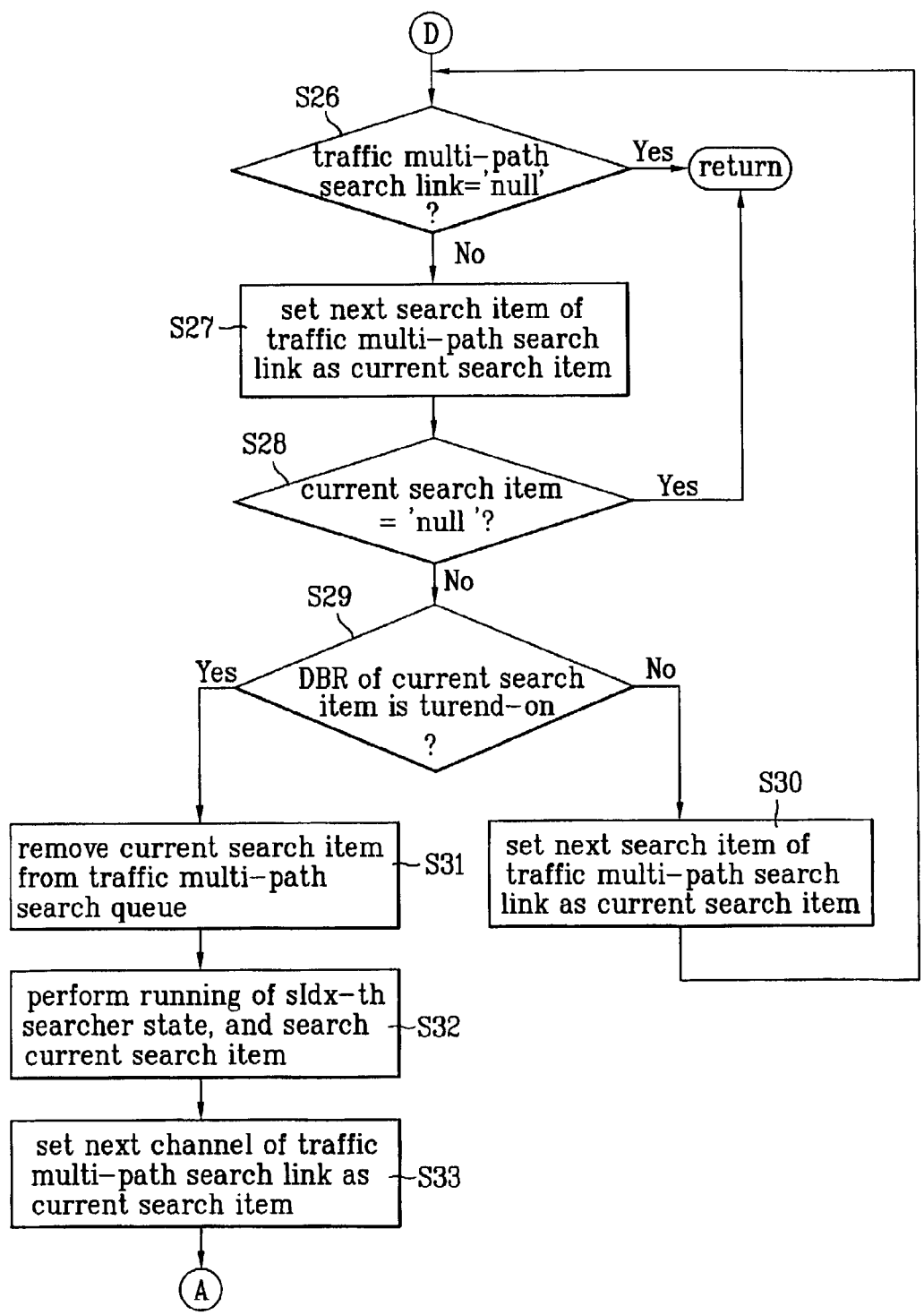

FIGS. 2a and 2b illustrate a flowchart explaining the search resource management subroutine in the searcher operating method according to a preferred embodiment of the present invention.

First, a number of items of the access channel search queue (ACH-Q) is set as a remaining access channel count (remainAchCnt). Then, a pointer that indicates a link type of MUL is set as pMul95Link, and a variable of a certain searcher index (sIdx) is initialized as '0' (step S11).

Then, it is judged whether the variable sIdx is smaller than the number N of searchers (step S12), and if not, the step returns.

If it is judged that the variable sIdx is smaller than the number N of the searchers at the step S12, it is judged whether the search item of the searcher is null (step S13), and if so, it is further judged whether a number of remaining access channels is larger than '0' (step S16). Herein, the search item of the searcher becomes null when the complete search of the access channels is wholly performed for overall search window or after a traffic multi-path search is completed on condition that DBR operation is turned on.

If it is judged that the search item is not null at the step S13, the search for the next sector of the search item or the next window is commanded (step S14), and the variable sIdx is increased by '1' (step S15).

Then, if it is judged that the number of remaining access channels is larger than '0' at the step S16, the access channel item is obtained from the ACH-Q, and is set as the current search item (CurrSrchItem), and the number of the ACHQ items is decreased by '1' (step S17).

Then, the remaining access channel count (remainAch-Cnt) is decreased by '1' (step S18).

Thereafter, it is judged whether the current time is the time for the access channel search (step S19). Herein, the time for the access channel search becomes effective where the last search-done time of the access channel (AchLastSrchDoneTime) is before the start time of the current slot and the present access frame index (AccessFrameIdx) is smaller than the access preamble size (AccessPamSize).

If it is judged that the current time is the time for the access channel search at the step S19, an search command is given so as to search for the current search item (step S20), and sIdx is increased by '1' (step S15).

However, if it is judged that the current time is not the time for the access channel search at the step S19, the current search item (CurrSrchItem) is put at the tail of the ACH-Q, and the number of items of the ACH-Q is increased by '1' (step S21)

Then, the variable sIdx is decreased by '1' (step S22).

However, if it is judged that the number of remaining access channels is not larger than '0' at the step S16, it is judged whether a number of items in the PAM-Q (traffic preamble queue) is larger than '0' (step S23), and if so, the first search item of the PAM-Q is obtained from the PAM-Q and is set as the current search item (CurrSrchItem), and the number of items of the PAM-Q is decreased is decreased by '1' (step S24).

Then, the sIdx-th searcher is commanded to search the current search item (step S25).

However, if it is judged that the number of items of the PAM-Q is not larger than '0' at the step S23, it is judged whether the traffic multi-path search link is null (step S26), and if so, the step returns.

If it is judged that the traffic multi-path search link is not null at the step S26, the next item of the traffic multi-path search link is obtained from the traffic multi-path search link and is set as the current search item (CurrSrchItem) (step S27).

Then, it is judged whether the current search item is null (step S28), and if so, the step returns, and if not as a result of judgment at the step S28, it is judged whether the DBR of the current search item (CurrSrchItem) is turned on (step S29).

If it is judged that the DBR of the current search item is turned on at the step S29, the current search item (CurrSrchItem) is removed from the MUL-Q, and the number of items of the MUL-Q is decreased by '1' (step S31).

Then, it is commanded that the sIdx-th searcher searches the current search item (CurrSrchItem), and the searcher becomes in a running state (step S32).

Thereafter, the next channel of the traffic multi-path search link is set as the current search item (step S33).

However, if it is judged that the DBR of the current search item is not turned on, the next channel of the traffic multi-path search link is set as the current search channel (step S30), and the step S26 is performed again.

The search mode for channels of the IS-2000 system is classified into three kinds: an enhanced access channel preamble search (EACH) mode, a traffic preamble search (PAM) mode, and a traffic multi-path search (MUL) mode.

Each search mode has a priority. A terminal starts an access only on the slot boundary, the slot offset is determined according to the start time of an access probe, and the slot offset is applied for the long code mask. The slot offset is a value obtained by dividing the system time having units of a Power Control Group by the slot duration corresponding to the unit of a PCG and then 512-modulo-operating the divided value. The slot offset is changed for each slot duration, and has 512 different values at maximum.

Also, the slot boundary of the EACH has its inherent offset by channels in the slot duration.

One slot includes a preamble section and a message capsule section by the unit of a frame in a basic access mode.

The EACH preamble search is performed during the preamble section of the slot, and the preamble section includes a preamble-on section and a preamble-off section which are alternately repeated several times, and an additional preamble section.

The EACH preamble search is a search having a highest priority, and the search is performed only during the preamble-on section for the efficient operation of searchers sections. The PAM search is a search having an intermediate priority, and the MUL search is a search having the lowest priority.

In a search information list required for M channels, search items common to all the channels are as follows.

Channel type: a channel type item informs whether a corresponding channel is an access channel or a traffic channel.

Search mode (SrchMode): a search mode item informs whether a search mode is the EACH, PAM, or MUL.

Number of search sectors (NumSrchSector): an item of the number of sectors informs a number of sectors for which the search is to be performed.

Search sector list (SrchSectorList): the search sector list item informs search sector lists (SearchSource (an index of searched sector and an antenna)) corresponding to a number of sectors for which the search should be performed, and information on a search start offset and a search window size (SearchStartOffset, SearchWindowSize).

Current Search sector index (CurrSrchSectorIdx): the current search sector index informs which sector is being searched among sectors which will be searched based on the SrchSectorList.

Current search window (CurrSrchWin): the current search window (CurrSrchWin) informs a number of a partial search when one partial search is performed during each search rake to perform the search during the SearchWindowSize.

Next, a search information list required for the enhanced access channel is as follows.

EACHPamOnLen: EACH preamble-on length (in PCG)
EACHPamOffLen: EACH preamble-off length (in PCG)
EACHPamFracNum: EACHPamFracNum informs a number of EACH preamble on/off repetition.

EACHSlotSize: EACH slot size

EACHSlotBoundaryOffset: Offset that the slot boundary of the EACH preamble has in the slot duration EACHSlotOffset: Slot offset number EACHLastSrchDoneTime: EACHLastSrchDoneTime informs the time when the complete search of the EACH is finally performed.

Since a reverse pilot signal is used for the multi-path search in the IS-2000 base station, there is no search item only that affects the coherent searcher operation method among parameters related to a traffic channel.

In the same manner as the first embodiment, the searcher operating method proposed in the present invention is briefly classified into 7 subroutines.

A first search subroutine is performed at a channel setup.

A second search subroutine is performed at a channel release.

A third search subroutine is performed at a search mode change of a channel.

A fourth subroutine is performed at a softer handoff mode setup.

A fifth subroutine is performed at a softer handoff mode release.

A sixth subroutine is a search resource management subroutine. A seventh subroutine is a search-done subroutine.

First, the search subroutine at the setup of a certain i-th channel is as follows.

At a first step, the channel type (ChannelType) of the search information list of the i-th channel is set to whether the channel is the enhanced access channel or the traffic channel.

The search mode (SrchMode) is set to an EACH in the access channel setup, and to a PAM in the traffic channel setup.

In case that the channel type is the EACH, EACHPamOnLen, EACHPamOffLen, EACHPamFracNum, EACHSlotSize, EACHSlotBoundaryOffset, and EACHSlotOffset are set as values allocated to the respective EACHs, and EACHLastSrchDoneTime is initialized as '0'.

At a second step, search parameters such as search source, search start offset, search window size, etc., corresponding to the certain i-th channel are set on the first search sector list (SrchSectorList) among the search information list of the certain i-th channel, and a number of search sectors (NumSearchSector) is set to '1'.

At a third step, the certain i-th channel is registered as a search item of the search queue corresponding to the search mode of the i-th channel(SrchMode).

Second, the search subroutine at the release of a certain i-th channel is as follows.

At a first step, the i-th channel search item is removed from the search queue corresponding to the search mode (SrchMode) of the i-th channel.

At a second step, the search sector list (SrchSectorList) of the i-th channel is flushed, and the number of the search sectors (NumSrchSector) is set to '0'.

Third, the search subroutine in the search mode change of a certain i-th channel is as follows.

With regard to traffic channels, when the search mode is changed from a preamble search mode to a multi-path search mode, the search mode (SrchMode) on the search information list of the i-th channel is set to the MUL.

Fourth, the search subroutine in the softer handoff mode setup of a certain i-th channel is as follows.

When any sector is added to an active set in a softer handoff procedure and information on the added sector is included by a search information list of the i-th channel, information on the search source (SearchSource), a search window size (SearchWindowSize), and a search start offset (SearchStartOffset) is included by the NumSrchSector-th search sector list (SrchSectorList), and a number of search sectors (NumSrchSector) is increased by '1'.

Fifth, the search subroutine in the softer handoff mode release of a certain i-th channel is as follows.

A number of search sectors (NumSrchSector) on the search information list of a certain i-th channel is decreased by '1'. Then, the information on the search source (SearchSource), the search start offset (SearchStartoffset), and the search window size (SearchWindowSize) of the sector is removed from the search sector list (SrchSectorList).

Sixth, the search resource management subroutine will be explained with reference to FIGS. 3a and 3b. Seventh, the search done subroutine will be explained with reference to FIGS. 4a and 4b.

Figure 3A:
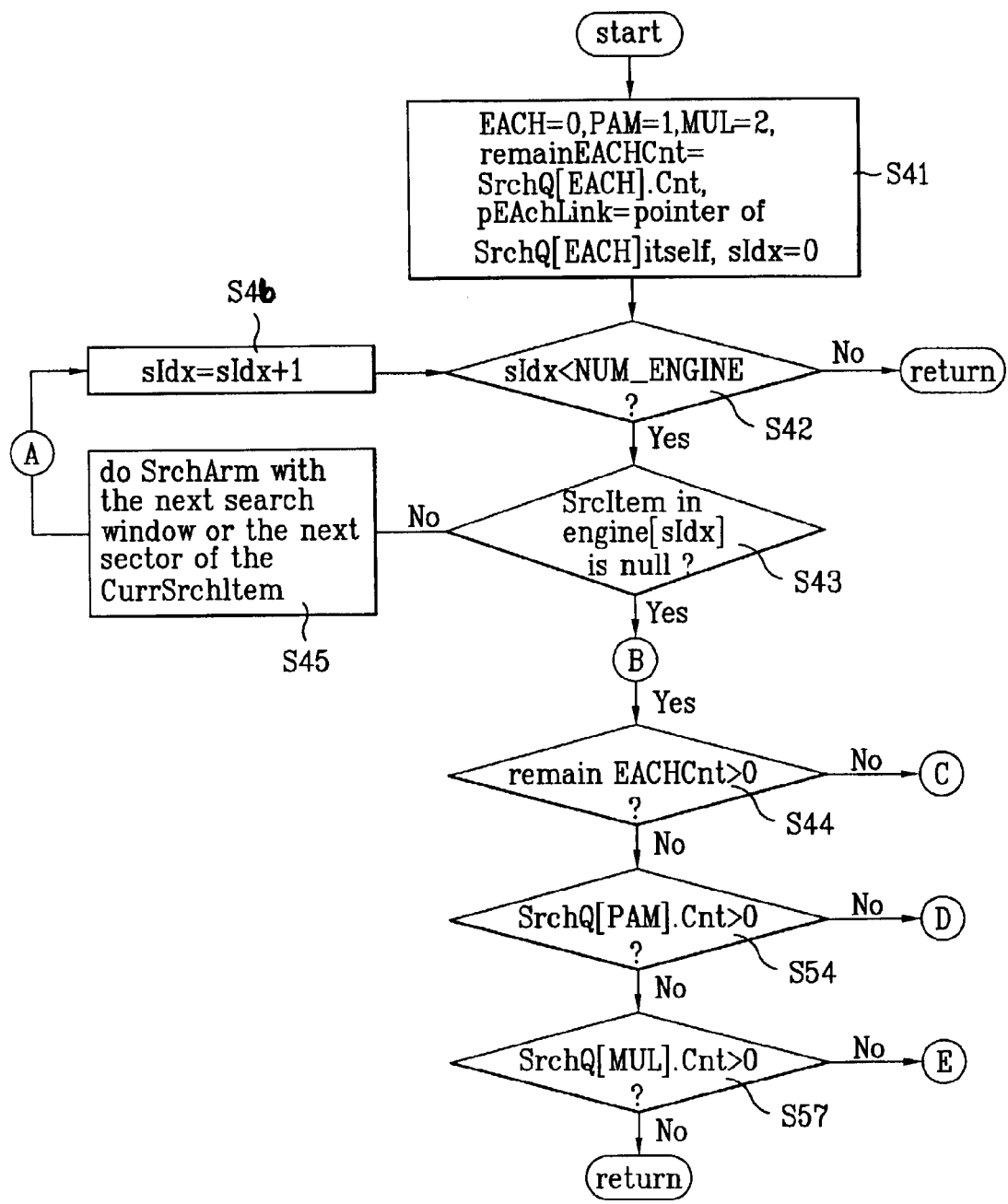
FIGS. 3a and 3b illustrate a flowchart explaining a search resource management subroutine in the searcher operating method according to a second embodiment of the present invention.
Figure 3B:
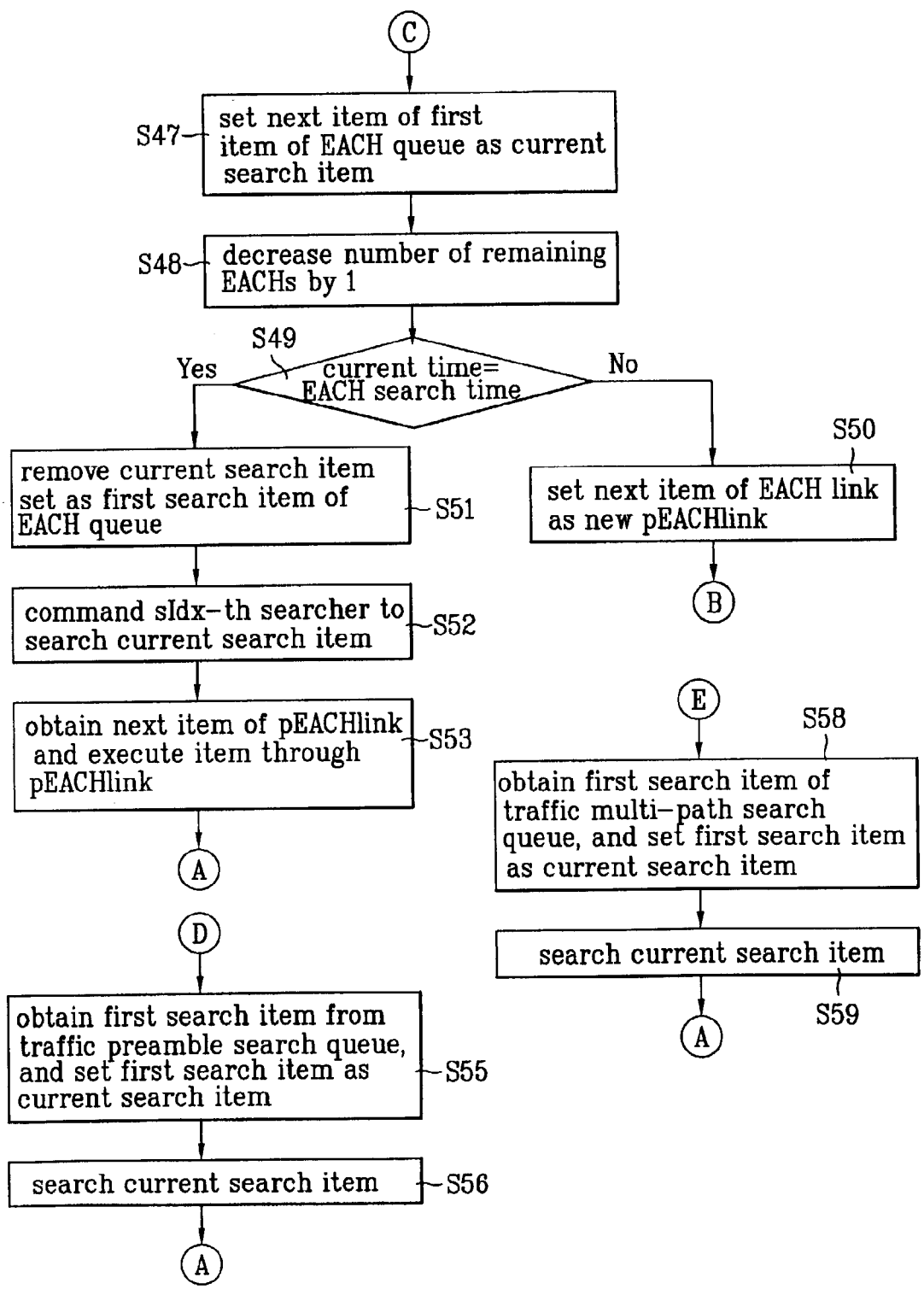

FIGS. 3a and 3b illustrate a flowchart explaining the search resource management subroutine in the searcher operating method according to the second preferred embodiment of the present invention.

First, a number of items of the EACH-Q is set as a remaining EACH count (remainEACHCnt). Then, a pointer that indicates a link type of the EACH-Q is set as pEACHLink, and a variable sItdx is initialized as '0' (step S41).

Then, it is judged whether the variable sIdx is larger than or equal to a number N of searchers (step S42), and if so, the step returns.

If it is judged that the variable sIdx is smaller than a number N of searchers at the step S42, it is judged whether a search item of the searcher is null (step S43), and if so, it is further judged whether the remaining EACH count (remainEACHCnt) is larger than '0' (step S44). Herein, the search item of the searcher becomes null when the search of the channels is wholly performed for overall search window or after the EACH channel is searched on condition that the preamble is turned on.

If it is judged that the search item of the searcher is not null at the step S43, the search for the next sector of the search item or the next window is commanded (step S45), and the variable of sIdx is increased by '1' (step S46).

If it is judged that the remaining EACH count is larger than '0' at the step S44, the first item of the EACH-Q, e.g., the next item of pEACHLink, is set as the current search item (CurrSrchItem) (step S47), and then the remaining EACH count (remainEACHCnt) is decreased by '1' (step S48).

Thereafter, it is judged whether the current time is the time for the EACH search (step S49). Herein, the time for the EACH search becomes effective if the EACH search is performed on condition that a preamble is turned on and the enhanced access channel last search-done time (EACHLastSrchDoneTime) is before the start time of the current slot.

If it is judged that the current time is not the time for the EACH search, the next item of pEACHLink is obtained from the EACH-Q and is set as pEACHLink (step S50), and the step S44 is performed.

However, if it is judged that the current time is the time for the EACH search at the step S49, the current search item (CurrSrchItem) set as the first item of the EACH-Q is removed from the EACH-Q, and the item count of the EACH-Q is decreased by '1'. At this time, the pointer of the EACH-Q automatically indicates the next item of the queue.

Then, a search command is given to the sItdx-th searcher so as to search the current search item (CurrSrchItem), and the searcher is controlled to be in a running state (step S52). The information on the search start offset (SearchStartOffset) and the search window size (SearchWindowSize) for the sector of the current sector index (CurrSectorIdx) on the search sector list (SrchSectorList) which the current search item (CurrSrchItem) includes is applied to the search.

Then, the next item of the pEACHLink is obtained from the EACH-Q and is set as the pEACHLink (step S53), and S44 is performed.

However, if it is judged that the number of remaining EACH count is not larger than '0' at the step S44, it is judged whether the number of items in the PAM-Q (traffic preamble search queue) is larger than '0' (step S54), and if so, the first search item of the PAM-Q is obtained from the PAM-Q and is set as the current search item (CurrSrchItem), and the number of items of the PAM-Q is decreased by '1' (step S55).

Then, the searcher is commanded to search the current search item (CurrSrchItem), and the state of the searcher is set to be in a running state (step S56).

However, if it is judged that the number of items in the PAM-Q is not larger than '0' at the step S54, it is judged whether the number of items existing in the traffic multi-path search queue (MUL-Q) is larger than '0' (step S57).

If it is judged that the item number is larger than '0', the step returns, while if not, the first item of the MUL-Q is obtained from the MUL-Q and is set as the current search item (CurrSrchItem), and the number of search items of the MUL-Q is decreased by '1' (step S58).

Then, the searcher is commanded to search the current search item (CurrSrchItem), the searcher becomes in a running state (step S59), and the step S46 is performed.

Figure 4A:
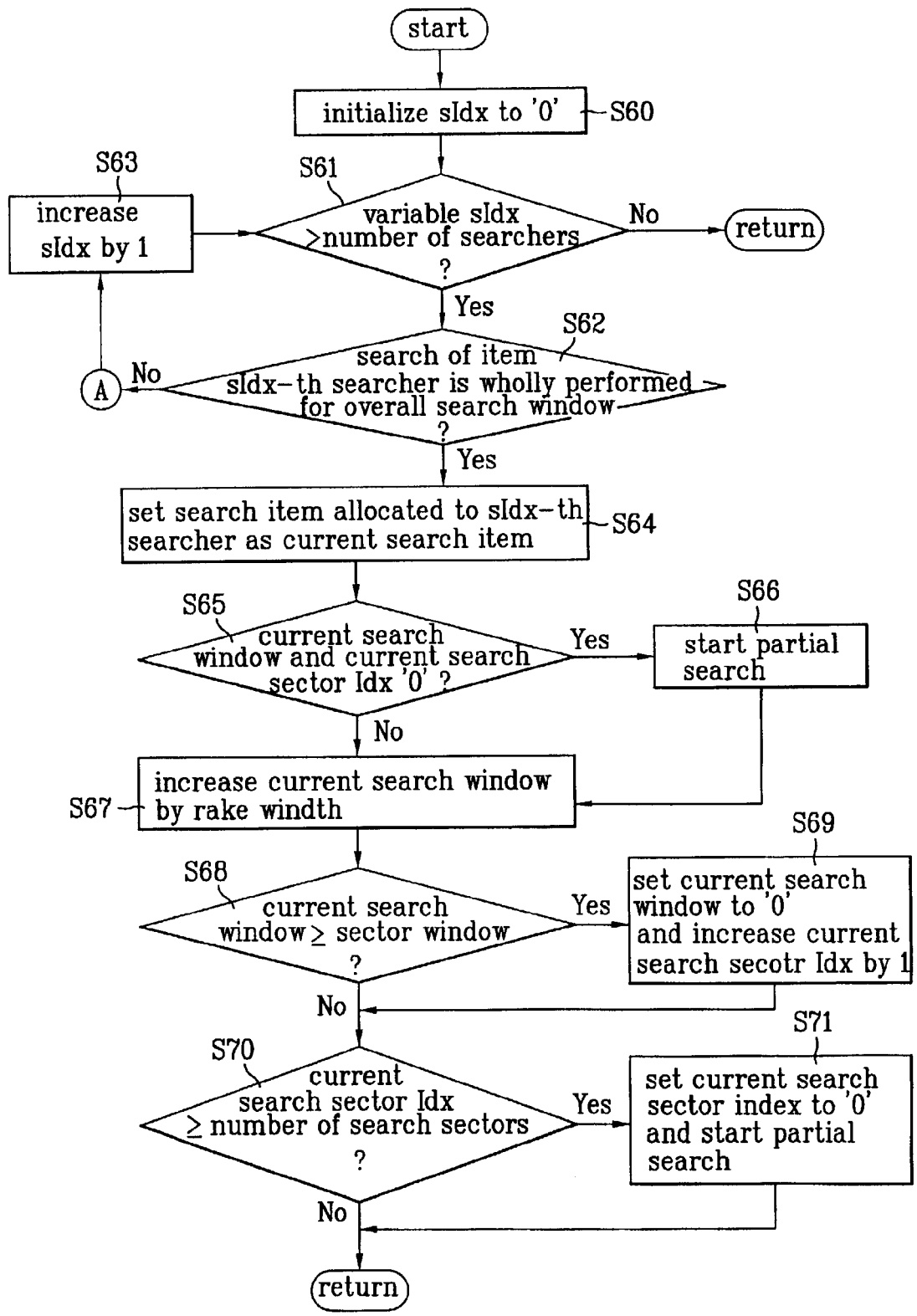
FIGS. 4a and 4b illustrate a flowchart explaining a search done subroutine in the searcher operating method according to the present invention.
Figure 4B:
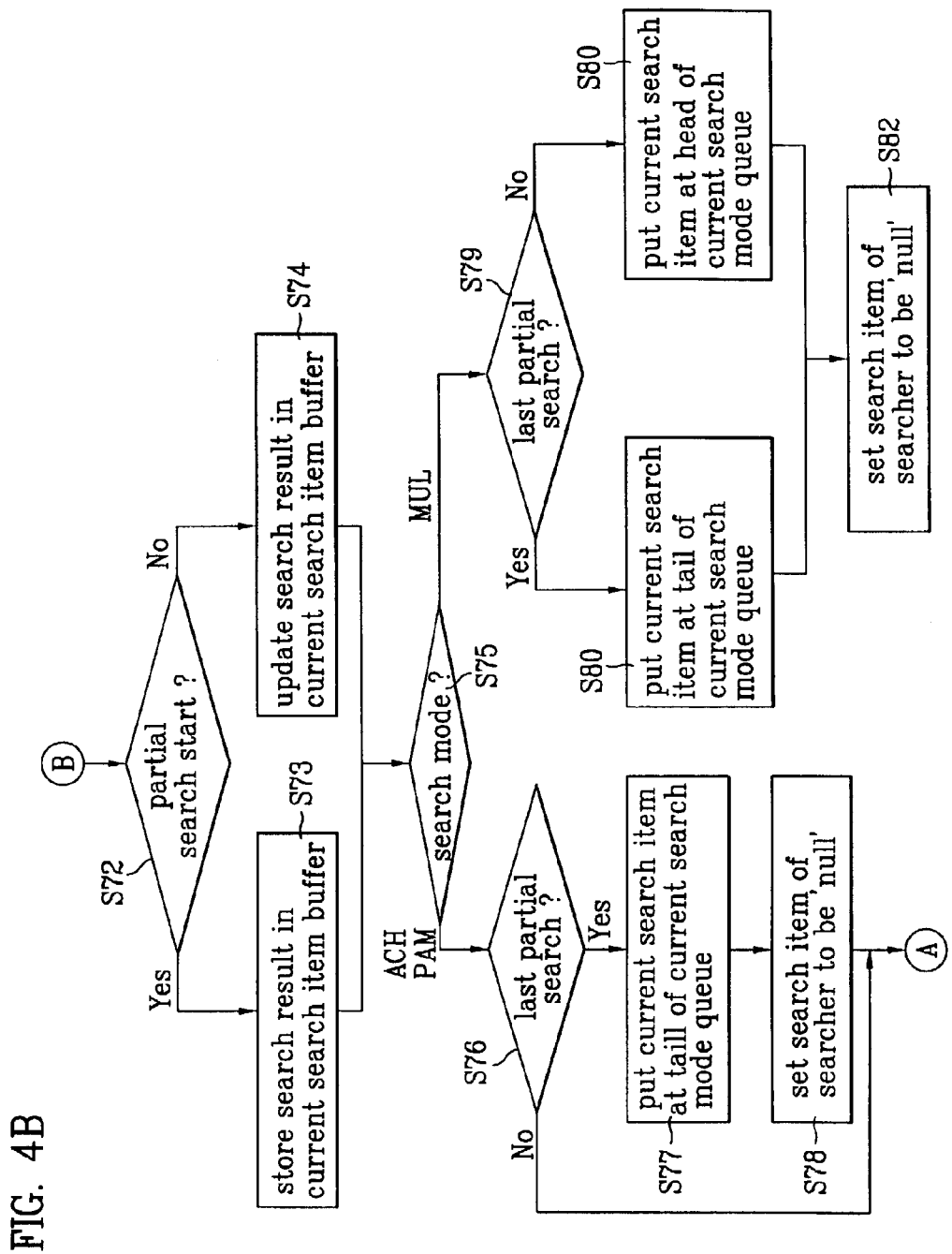

FIGS. 4a and 4b illustrate a flowchart explaining the search done subroutine in the searcher operating method according to the first and second embodiment of the present invention.

The search done subroutine first initializes a variable sIdx as '0' (step S60). At this time, bStartPartialSearch and bLastPartialSearch are initialized as 'FALSE', respectively.

Then, it is judged whether the next variable sIdx is smaller than a number N of searchers, and if not, the step returns (step S61).

If it is judged that the next variable sIdx is smaller than the number N of searchers at the step S61, it is judged whether the searcher is in a search-done state (step S62), and if not, sIdx is increased by '1' (step S63).

If it is judged that the searcher is in the search-done state at the step S62, search item allocated to the sIdx-th searcher is set as the current search item (CurrSrchItem) and information on a number of search sectors (NumSrchSector) current search window (CurrSrchWin), and which sector is first searched among the sectors to be searched on the search sector list is set as those of the current search item (CurrSrchItem) (step S64).

Then, it is judged whether CurrSrchSectorIdx is '0' and CurrSrchWin is '0' on the search information list (step S65).

If it is judged that CurrSrchSectorIdx is '0' and CurrSrchWin is '0' at the step S65, the partial search start (bStartPartialSearch) is set to 'TRUE' (step S66), and the current search window (CurrSrchWin) is increased by a rake width (step S67).

However, if it is judged that CurrSrchSectorIdx is not '0' and/or CurrSrchWin is not '0' at the step S65, the current search window (CurrSrchWin) is increased by a rake width (step S67).

Then, it is judged whether the current search window (CurrSrchWin) is larger than or equal to the search window size (SearchWindowSize) for the sector of the current search sector index (CurrSrchSectorIdx) of the search sector list (SrchSectorList) (step S68).

If it is judged that the current search window is larger than or equal to the search window size at the step S68, the current search window (CurrSrchWin) is set to '0', and the current search sector index (CurrSrchSectorIdx) is increased by '1' (step S69).

It is judged whether the current search sector index (CurrSrchSectorIdx) is larger than or equal to the number of search sectors (NumSrchSector) (step S70), and if so, the current search sector index (CurrSrchSectorIdx) is set to '0', and a partial search (bLastPartialSearch) start is set to 'TRUE' (step S71).

It is judged whether the partial search (bStartPartialSearch) starts (step S72), and if so, the search result is stored in the current search item buffer (step S73), while if not, the search result of the buffer is updated (step S74).

Then, the search mode is judged (step S75).

If the search mode is judged to be the ACH (or MUL in the second embodiment) or the PAM at the step S75, it is judged whether the partial search is the last one (step S76), and if so, the current search item is stored in the tail of the current search mode queue (step S77), and the search item of the searcher is set to be null (step S78).

However, if the search mode is judged to be the MUL (EACH in the second embodiment) at the step S75, it is judged whether the partial search is the last one (step S79), and if so, the current search item is put at the tail of the current search mode queue (step S80), and the search item of the searcher is set to be null (step S82).

Meanwhile, if it is judged that the partial search is not the last one at the step S79, the current search item is put at the head of the current search mode queue (step S81), and the search item of the searcher is set to be null (step S82).

As described above, according to the present invention, M channels can share N searchers in a time division manner and DBR information of the respective channels is used in the communication system, and especially in the IS-95-A/B base station, so that more effective operation of searchers can be achieved.

Also, according to the present invention, M channels can share N searchers in a time division manner and the searches of the respective channels are performed according to their priorities in the communication system, and especially in the IS-2000 base station, so that more effective operation of searchers can be achieved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of operating at least one searcher in a CDMA mobile communication system, comprising:

(a) setting a number of channels of a first queue of an access preamble search mode as a number of remaining access channels;

(b) when a number of allocated searchers is less than that of all searchers, setting a first priority search item of the first queue for the access preamble search mode to a current search item and checking whether a search for the first priority search item in the first queue is possible;

(c) when the search for the first priority search item is possible, allocating a searcher to the first priority search item of the first queue;
(d) searching the first priority search item of the first queue in the access preamble search mode until the first priority search item is nulled;
(e) repeating the (b), (c), and (d) steps until the number of allocated searchers is not less than that of all of the searchers;
(f) when the number of remaining access channels is equal to '0', setting a first priority search item of a second queue for a traffic preamble search mode to the current search item and allocating the searcher to the first priority search item of the second queue searching the first priority search item of the second queue in the traffic preamble search mode; and
(g) when the first priority search item of the second queue is nulled, setting a first priority search item of a third queue for a traffic multi-path search mode to the current item and allocating the searcher to the first priority search item of the second queue searching the first priority search item of the third queue.

2. The method of claim 1, further comprising determining whether a current search time is in a burst randomization mode or not.

3. The method of claim 1 wherein the (d) step further comprises:
partial searching by at least one of a search sector or a search window of the search item.

4. The method of claim 3, further comprising:
storing and updating the partial search result by the at least one of the search sector or the search window.

5. The method of claim 1, wherein if the mobile communication system supports an enhanced access channel, the access channel is replaced as the enhanced channel and the access preamble search mode is replaced as the enhanced access preamble search mode.

6. The method of claim 1, further comprising determining whether a current search time is in an access preamble search time or not.

7. A method of operating a searcher in a CDMA mobile communication system comprising:
setting a priority of a search item of an access search mode to the lowest in a queue of an access search mode if a last partial search of the access search mode is performed;
setting a priority of a search item of a traffic preamble search mode to the lowest in a queue of a traffic preamble search mode if a last partial search of the traffic preamble search mode is performed;
maintaining a priority of a search item of a traffic multi-path search mode in IS-95A/B system, to be the same in a queue of a traffic multi-path search mode if a last partial search of the traffic multi-path search mode is not performed; and
setting the priority of a search item of a traffic multi-path search mode in IS-95A/B system, to the lowest in a queue of a traffic multi-path search if the last partial search of the traffic multi-path search mode is not performed.

8. A method of operating a searcher in a CDMA mobile communication system, comprising:
maintaining a priority of a search item of an enhanced access search mode to be the same in a queue of an enhanced access search mode if a last partial search of the enhanced access search mode is not performed;
setting the priority of a search item of an enhanced access search mode to the lowest in a queue of an enhanced access search mode if the last partial search of the enhanced access search mode is performed;
setting a priority of a search item of a traffic preamble search mode to the lowest in a queue of a traffic preamble search mode if a last partial search of the traffic preamble search mode is performed; and
setting the priority of a search item of a traffic multi-path search mode, to the lowest in a queue of a traffic multi-path search mode if a last partial search of the multi-path search mode is performed.

* * * * *